United States Patent

Barton

[15] 3,694,934

[45] Oct. 3, 1972

[54] DEMONSTRATOR SYSTEM FOR VEHICLE COOLING SYSTEM

[72] Inventor: Frederic D. Barton, 47736 Ahumanu Loop, Kaneohe, Hawaii

[22] Filed: June 9, 1971

[21] Appl. No.: 151,313

[52] U.S. Cl. ....................35/13

[51] Int. Cl. ....................G09b 25/02

[58] Field of Search............35/13, 49, 50, 51, 10, 11, 35/19 R

[56] References Cited

UNITED STATES PATENTS

| | | | |
|---|---|---|---|
| 2,987,830 | 6/1961 | Jackson | 35/13 |
| 2,526,044 | 9/1970 | Dwiggins | 35/13 |
| 3,535,798 | 10/1970 | Turman | 35/51 |

*Primary Examiner*—Wm. H. Grieb
*Attorney*—William L. Fisher

[57] ABSTRACT

Cooling system demonstrator means for demonstrating the action of a vehicle cooling system are disclosed comprising means for forcing liquid without heating the same under pressure into a vehicle radiator to simulate the heating and expansion of said cooling system from engine heat and means for withdrawing liquid without heating the same under suction from said radiator to simulate the cooling of said cooling system to ambient temperature.

18 Claims, 5 Drawing Figures

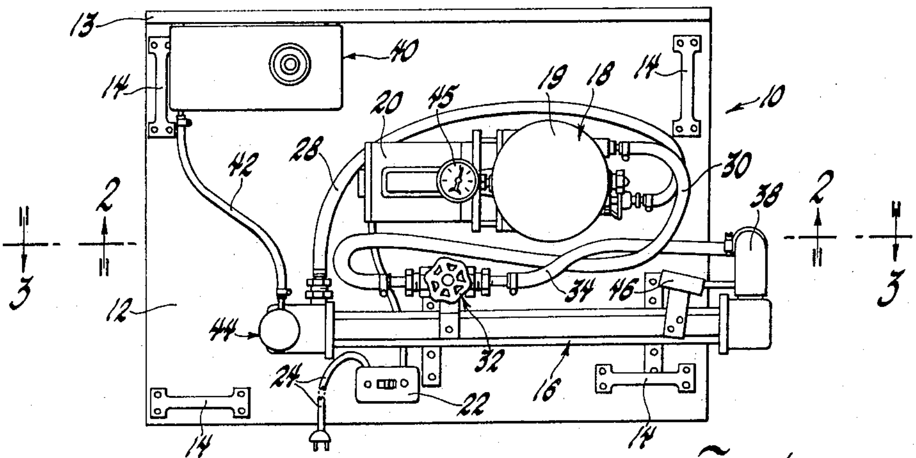
Fig.1
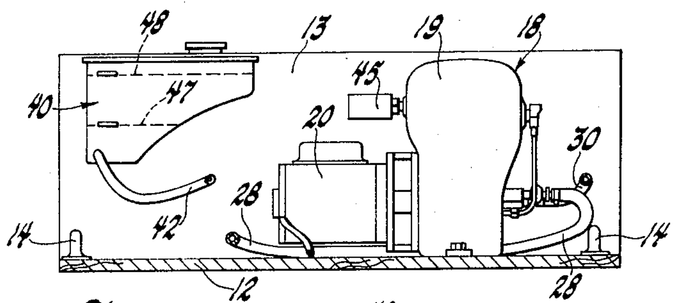
Fig.2
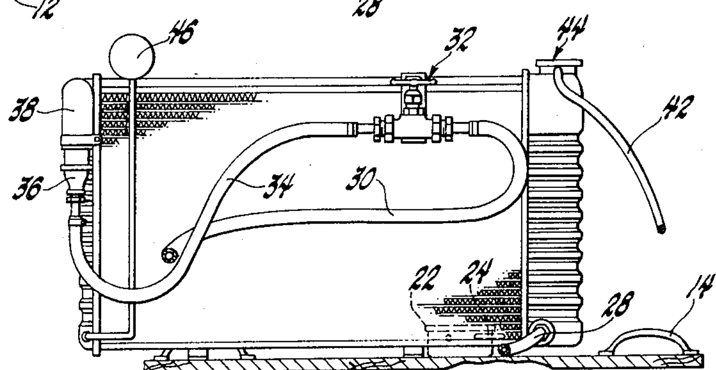
Fig.3
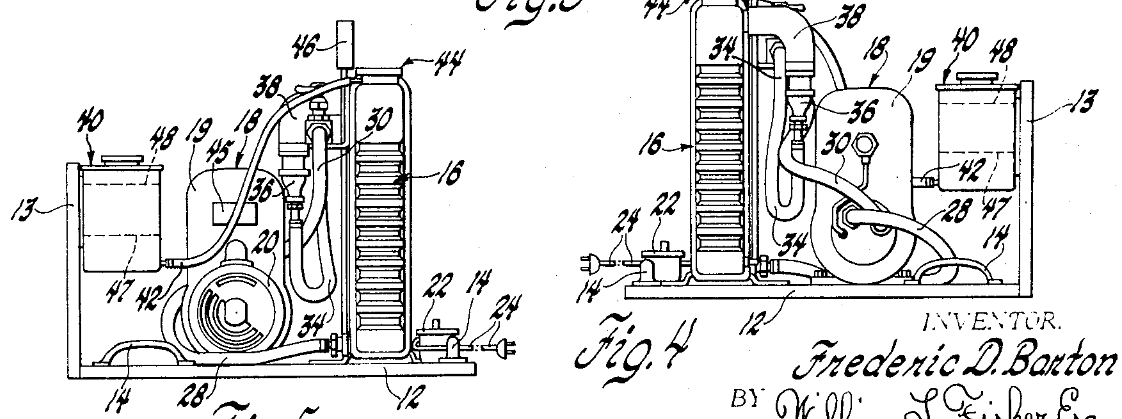
Fig.5
Fig.4
INVENTOR.
Frederic D. Barton
BY William L. Fisher Esq.
HIS ATTORNEY

DEMONSTRATOR SYSTEM FOR VEHICLE COOLING SYSTEM

My invention relates to vehicle cooling systems.

The principal object of my invention is the provision of a demonstrator system which demonstrates the action of a vehicle cooling system for educating interested observers and to show how to properly open the radiator cap.

The foregoing object of my invention and the advantages thereof will become apparent during the course of the following description, taken in conjunction with accompany drawings, in which:

FIGS. 1, 4 and 5 are, respectively, top plan and opposite end elevation views of a demonstrator system embodying my invention; and FIGS. 2 and 3 are vertical sectional views taken, respectively, on the lines 2—2 and 3—3 of FIG. 1.

Referring to the drawings in greater detail, 10 generally designates said embodiment which comprises, in combination, a portable base 12 having lifting handles 14 for lifting said embodiment 10 to transport it from place to place. Said base 12 supports a vertical back wall 13. A vehicle radiator 16 and means 18 for maintaining a liquid source external to said radiator 16 are mounted upon the base. Said means 18 include pneumatic accumulator means 19 which contains liquid and air under pressure above said liquid. An alternating current electrical motor 20 and an electrical switch 22 also mounted upon said base 12. Said switch 22 is wired in series circuit with said motor 20 via one of the power lines contained in a power cord 24 to control the electrical power to said motor 20. Said motor 20 drives a liquid pump (not shown) inside of said accumulator means 19 which pump has a suction inlet port to which is connected one end of a liquid line 28 the other end of which is connected to the radiator outlet at the bottom of the radiator 16. The pressure outlet port of said pump is inside of said accumulator means 19. Said accumulator means 19 has a pressure discharge port to which one end of a liquid line 30 is connected, the other end of which is connected to one side of a gate valve 32 mounted upon said radiator 16. Another liquid line 34 is connected via one of its ends to the other side of said gate valve 32 and via its other end to a reversely oriented reducer connection 36 which in turn is connected to a short length of automobile radiator hose 38 connected to the radiator inlet at the top of the radiator 16. The radiator 16 is maintained full and a holding tank 40 mounted upon the back wall 13 is provided for holding the overflow from the radiator 16. A liquid line 42 connects the inlet of said holding tank 40 with the overflow port in the neck of the radiator on which the radiator cap 44 fits. The radiator 16 is horizontally disposed, i.e., with its end sections vertical and with its tubes horizontal. Pressure gages 45 and 46 are connected, respectively, to the accumulator means 19 and to the radiator 16 so as to register the pressure of the liquid in these containers.

In operation of my invention, the embodiment 10 is filled with a liquid, preferably water mixed with antifreeze, so that the liquid is colored and can be seen better in the clear plastic hoses 28, 30, 34, and 42 and in the translucent holding tank 40. The radiator 16 is always filled to the top thereof. The level of liquid in the holding tank 40 is at a level, indicated at 47, exactly as in the case of a cooling system in its cooled condition which level is marked "Add" on said holding tank 40. The gate valve 32 is first closed and the switch 22 actuated to energize the motor 20 to drive the liquid pump to build up the pressure in the accumulator means 19 to a maximum which is approximately three times the normal operating pressure of the radiator 16.

To simulate the heating and expansion of a cooling system from engine heat the liquid under pressure in the accumulator means 19 and in the liquid line 30 is forced without heating the same into the radiator 16 by opening of the gate valve 32 until said radiator 16 is pressurized to the pressure at which it normally operates. The pressure at which the radiator 16 normally operates is determined by the pressure at which the pressure valve of the radiator cap 44 opens. In present day full radiator type radiators this pressure is factory pre-set at 15 lbs. per square inch. The forcing of liquid into the radiator 16 by opening of the valve 32 realistically simulates the heating and pressurization of a cooling system from engine heat and forcefully opens the pressure valve of the radiator cap 44 causing liquid to flow from the radiator 16 through the overflow port in the neck thereof and through the liquid line 42 into the holding tank 40. The pressure in the accumulator means 19, in the liquid line 30 and in the radiator 16 equalizes itself from opening of the valve 32 at said normal operating pressure of the radiator 16. The liquid level in the holding tank 40 rises to a level, indicated at 48, exactly as in the case of a cooling system in its heated and pressurized condition which level is marked "Full" on said holding tank 47. The embodiment 10 is now in a condition to show how to properly open the radiator cap 44 of a simulated heated and pressurized radiator 16. For safety and to prevent unnecessary loss of coolant the radiator cap 44 must be opened in two steps, but first the gate valve 32 is closed to conserve the 15 lb. per square inch pressure in the accumulator means 19 and in the liquid line 30. The radiator cap 44 must first be rotated 60° counterclockwise to vent the pressure in the radiator to atmospheric pressure. When this is done the pressure in the accumulator means 19 and in the radiator 16 vents to atmospheric pressure. The inlet hose 38 is squeezed to be sure that it is slack indicating zero gauge pressure on the radiator 16. Thereafter the radiator cap 44 must be pressed downwardly upon with the palm of the hand and rotated another 60° counterclockwise whereupon the radiator cap 44 can be lifted off the neck of the radiator and thus be opened. In this condition of the embodiment 10 simulating a cooling system when it is heated, pressurized and vented by opening of the radiator cap, if the liquid level in the holding tank 40 does not reach the "Full" level 48 it indicates a condition of leakage of coolant which should be corrected by the addition of make-up coolant to see if the condition persists and, if it does, then by the addition of my cooling system stop leak composition which is my patented composition consisting of ginger root flour and soluble oil presently marketed under the trademark "Bar's Leaks", U.S. Pat. Nos. Re 24,094 and 2,935,189 Such stop leak composition must be added through the open neck of the radiator 16 while the radiator cap 44 is removed and in solid form since the radiator is full of liquid whereupon it will descend downwardly in the radiator and disintegrate in the hot liquid as it does so. The radiator cap 44 is replaced after the addition of make-up coolant and a stop lead composition by pressing downwardly upon it with the palm of the hand and rotating it 60° clockwise and by rotating it another 60° clockwise to fully closed position.

To simulate the cooling of a cooling system to ambient temperature which inevitably occurs when a vehicle is left standing without driving it, the gate valve 32 is maintained closed and liquid is withdrawn without heating the same under suction from the radiator 16 by actuating the switch 22 to energize the motor 20 whereupon suction is developed by the pump in the liquid line 28 which withdraws liquid under suction from the radiator 16 and transfers it to the accumulator means 19. The withdrawal of liquid from the radiator 16 under suction realistically simulates the cooling of a cooling system and opens the vacuum valve of the radiator cap 44 causing liquid to flow from the holding tank 40 through the liquid line 42 and through the overflow port in the neck of the radiator 16 into said radiator 16. The level of the liquid in the holding tank 40 falls to the "Add" level 47 exactly as in the case of a cooling system in its cooled condition as previously mentioned. The pressure in the radiator 16 reaches a negative gauge pressure from the action of the pump driven by the motor 20 while the pressure in the accumulator means 19 builds up to its maximum pressure whereupon the switch 22 must be actuated to de-energize the motor 20. The embodiment 10 is again in the condition previously mentioned with the pressure in the accumulator means 19 at a maximum and the gate valve 32 closed ready to simulate the heating and pressurization of a cooling system from engine heat.

It will thus be seen that there has been provided by my invention cooling system demonstrator means and method in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims. My demonstrator system serves to impart in a short time to interested observers, such as service station operators, the correct understanding of the action of a vehicle cooling system, particularly full radiator type cooling systems, by visually and realistically simulating such cooling system action including the circulating of liquid between the radiator and the holding tank and shows them the proper way to open a radiator cap by allowing them to do this for themselves while the coolant is not hot so they will gain experience in opening the radiator cap of a pressurized radiator.

What is claimed is:

1. Cooling system demonstrator means for demonstrating the action of a vehicle cooling system comprising a vehicle radiator, means for forcing liquid without heating the same under pressure into said radiator to simulate the heating and expansion of said cooling system from engine heat and means for withdrawing liquid without heating the same under suction from said radiator to simulate the cooling of said cooling system to ambient temperature.

2. Demonstrator means as claimed in claim 1 further comprising means for holding liquid without heating the same in said radiator under pressure at which said radiator normally operates until the radiator is vented to atmospheric pressure by opening said radiator cap to simulate the condition prevailing when the radiator cap must be opened while said cooling system is heated and pressurized.

3. Demonstrator means as claimed in claim 1 further comprising a holding tank, means for transferring liquid from said radiator into said holding tank to simulate said heating and expansion of said cooling system, and means for transferring liquid from said holding tank into said radiator to simulate the cooling of said cooling system.

4. Demonstrator means as claimed in claim 1 further comprising means for maintaining a liquid source external to the radiator under air pressure and means for circulating liquid between said liquid source and said radiator to simulate both the heating and expansion and the cooling of said cooling system.

5. Demonstrator means as claimed in claim 3 further comprising means for maintaining a liquid source external to the radiator under air pressure and means for circulating liquid between said liquid source and said radiator to simulate both the heating and expansion and the cooling of said cooling system.

6. Demonstrator means as claimed in claim 4 further comprising means for building up the pressure in said liquid source to greater than said normal operating pressure during said step of simulating cooling of said cooling system.

7. Demonstrator means as claimed in claim 4 further comprising means for reducing the pressure in said liquid source to said normal operating pressure during said step of simulating the heating and expansion of said cooling system from engine heat.

8. Demonstrator means as claimed in claim 4 further comprising means for holding liquid without heating the same in said radiator under pressure at which said radiator normally operates until the radiator is vented to atmospheric pressure by opening said radiator cap to simulate the condition prevailing when the radiator cap must be opened while said cooling system is heated and pressurized.

9. Demonstrator means as claimed in claim 8 further comprising valve means for closing off the connection between said liquid source and the inlet to said radiator to conserve the pressure in said liquid source at said normal operating pressure during said step of simulating the condition prevailing when the radiator cap must be opened while said cooling system is heated and pressurized.

10. Demonstrator means as claimed in claim 4 further comprising pneumatic accumulator means containing said liquid source under air pressure, conduit means connecting said accumulator means and said radiator, and liquid pump means for circulating liquid via said conduit means between said accumulator means and said radiator.

11. Cooling system demonstrator method for demonstrating the action of a vehicle cooling system comprising simulating the heating and expansion of said cooling system from engine heat by forcing liquid without heating the same under pressure into a vehicle radiator and simulating the cooling of said cooling system to ambient temperature by withdrawing liquid without heating the same under suction from said radiator.

12. Demonstrator method as claimed in claim 11 further comprising simulating the condition prevailing when the radiator cap must be opened while said cooling system is heated and pressurized by holding liquid without heating the same in said radiator under the pressure at which said radiator normally operates until the radiator is vented to atmospheric pressure by opening said radiator cap.

13. Demonstrator method as claimed in claim 11 further comprising maintaining said radiator full and transferring liquid without heating the same from said radiator into a holding tank during said step of simulating the heating and expansion of said cooling system, and transferring liquid from said holding tank into said radiator during said step of simulating the cooling of said cooling system.

14. Demonstrator method as claimed in claim 11 further comprising maintaining a liquid source external to the radiator under air pressure and circulating liquid between said liquid source and said radiator during said simulating steps.

15. Demonstrator method as claimed in claim 14 further comprising building up the pressure in said liquid source to greater than said normal operating pressure during said step of simulating cooling of said cooling system.

16. Demonstrator method as claimed in claim 15 further comprising reducing the pressure in said liquid source to said normal operating pressure during said step of simulating the heating and expansion of said cooling system from engine heat.

17. Demonstrator method as claimed in claim 13 further comprising simulating the condition prevailing when the radiator cap must be opened while said cooling system is heated and pressurized by holding liquid without heating the same in said radiator under the pressure at which said radiator normally operates until the radiator is vented to atmospheric pressure by opening said radiator cap.

18. Demonstrator method as claimed in claim 17 further comprising conserving the pressure in said liquid source at said normal operating pressure during said step of simulating the condition prevailing when the radiator cap must be opened while said cooling system is heated and pressurized by closing off the connection between said liquid source and the inlet to said radiator.

* * * * *